(12) United States Patent
Sanjeev

(10) Patent No.: US 8,965,982 B1
(45) Date of Patent: Feb. 24, 2015

(54) BACKUP AND RESTORING INSTANT MESSAGES

(75) Inventor: Kumar Sanjeev, San Ramon, CA (US)

(73) Assignee: Cellco Partnership, Basking Ridge, NJ (US)

( * ) Notice: Subject to any disclaimer, the term of this patent is extended or adjusted under 35 U.S.C. 154(b) by 195 days.

(21) Appl. No.: 12/955,209

(22) Filed: Nov. 29, 2010

(51) Int. Cl.
G06F 15/16 (2006.01)

(52) U.S. Cl.
USPC .......... 709/206; 709/203; 709/204; 709/205; 709/207; 455/412.1; 455/412.2; 455/466

(58) Field of Classification Search
USPC ................................................ 709/203–207
See application file for complete search history.

(56) References Cited

U.S. PATENT DOCUMENTS

| | | | | |
|---|---|---|---|---|
| 5,920,826 | A * | 7/1999 | Metso et al. | 455/557 |
| 7,146,163 | B2 * | 12/2006 | Borsan | 455/422.1 |
| 7,610,041 | B2 * | 10/2009 | Lim | 455/412.1 |
| 8,001,190 | B2 * | 8/2011 | Bernstein et al. | 709/206 |
| 8,078,206 | B2 * | 12/2011 | Chang | 455/466 |
| 8,122,210 | B2 * | 2/2012 | Tsukada | 711/162 |
| 2005/0246339 | A1 * | 11/2005 | Kamegaya et al. | 707/9 |
| 2007/0067399 | A1 * | 3/2007 | Kulkarni et al. | 709/206 |
| 2007/0088801 | A1 * | 4/2007 | Levkovitz et al. | 709/217 |
| 2007/0242809 | A1 * | 10/2007 | Mousseau et al. | 379/88.18 |
| 2008/0176602 | A1 * | 7/2008 | Kim | 455/564 |
| 2008/0208984 | A1 * | 8/2008 | Rosenberg et al. | 709/206 |
| 2008/0263157 | A1 * | 10/2008 | Bhogal et al. | 709/206 |
| 2009/0075630 | A1 * | 3/2009 | Mclean | 455/411 |
| 2010/0159889 | A1 * | 6/2010 | Sigmund et al. | 455/413 |
| 2010/0161753 | A1 * | 6/2010 | Klassen et al. | 709/217 |
| 2012/0028659 | A1 * | 2/2012 | Whitney et al. | 455/466 |

OTHER PUBLICATIONS

Verizon Wireless. Backup Assistant. 2010. 3 pages Printed Nov. 15, 2010 from https://wbillpay.verizonwireless.com/vzw/nos/ba__nab/overview_def.jsp.
The SpriteMobile backup. TechnoBuzz, "Backup and Restore Your Mobile Phone with Mobical." Jan. 31, 2008. 5 pages. Printed Nov. 15, 2010 from http://www.technobuzz.net/backup-restore-your-mobile-phone-with-mobical/.
SpriteBackup. Product Overview. Sprite Mobile. Printed on Nov. 17, 2010 from http://www.spritesoftware.com/products/sprite-backup/full-edition.
Sprite Mobile—Android Backup—SMS, Bookmarks, System Settings, Application Settings. Printed Nov. 10, 2010 http://www.spritesoftware.com/products/android.

* cited by examiner

Primary Examiner — Ario Etienne
Assistant Examiner — Kidest Mendaye

(57) ABSTRACT

A wireless mobile communication device may allow a user to select one or more stored instant messages for backing up. The selected instant messages may be delivered to and stored within a computer storage system which is external to the wireless mobile communication device. Each selected instant messages may be delivered to and stored within an email server as part of an email message. One or more of the selected instant messages may be deleted from the internal computer storage system after being delivered to the external computer storage system. The user may specify a schedule for the backing up and/or the deleting. The user may select one or more of the backed-up instant messages that are stored in the external computer storage system for restoring on the wireless mobile communication device.

21 Claims, 3 Drawing Sheets

FIG. 3

Select instant messages to backup

Please enter criteria for selecting instant messages to backup

☑ Sent by: <u>John Doe</u>
☑ Received: <u>On or after 1/1/09</u>
☐ Select individually . . .
☐ All

FIG. 4

Enter backup schedule

Please enter schedule for backing up instant messages

☑ Every <u>Monday at 1 AM</u>
☐ After read
☐ Do not backup

FIG. 5

Select instant messages to delete

Please enter criteria for selecting instant messages to delete

☑ Sent by: <u>John Doe</u>
☑ Received: <u>On or after 1/1/09</u>
☐ Select individually . . .
☐ All

BACKUP AND RESTORING INSTANT MESSAGES

BACKGROUND

1. Technical Field

This disclosure relates to instant messages stored on wireless mobile communication devices.

2. Description of Related Art

Wireless mobile communication devices, such as smart phones, may receive and store instant messages.

The storage device in the wireless mobile communication device may become full, preventing the storage of further instant messages or other data. Older instant messages may be deleted to help alleviate this problem. Once deleted, however, they may not be obtainable from another source which is accessible to the user of the wireless mobile communication device.

Users may also want to upgrade their wireless mobile communication devices or for other reasons communicate through different wireless mobile communication devices. The libraries of instant messages which are stored on the original wireless mobile communication devices, however, may not be available when using these other mobile communication devices.

SUMMARY

A wireless mobile communication device may include a wireless mobile communication system configured to communicate wirelessly over a network communication system, an internal computer storage system configured to store instant messages, a user interface configured to allow a user to select one or more of the stored instant messages for backing up, and a computer processing system configured to cause the selected instant messages to be delivered to and stored within a computer storage system which is external to the wireless mobile communication device.

The user interface may include a query component configured to allow the user to specify a query which selects the instant messages for backing up. The query component may be configured to allow the user to specify a query which selects the instant messages for backing up based on the name of the sender of the instant messages, a date of the instant messages, and/or the content of the instant messages.

The user interface may be configured to allow the user to specify a schedule for backing up. The computer processing system may be configured to cause the selected instant messages to be delivered to the external computer storage system in accordance with the schedule.

The external computer storage system may include a flash memory, such as a micro SD card. The computer processing system may be configured to cause the selected instant messages to be delivered to and stored within the flash memory.

The external computer storage system may include a server. The computer processing system may be configured to cause the selected instant messages to be delivered to and stored within the server.

The server may include an email server. The computer processing system may be configured to cause each of the selected instant messages to be delivered to and stored within the email server as part of an email message.

At least one of the instant messages may be an instant SMS message. The computer processing system may be configured to cause the at least one instant SMS message to be delivered to and stored within the external email server as part of the text of the email message.

At least one of the instant messages may be an instant MMS message. The computer processing system may be configured to cause the at least one of the instant MMS messages to be delivered to and stored within the external email server as an attachment to the email message.

At least one of the selected instant messages may be sent from a phone having a phone number. The computer processing system may be configured to cause the phone number from which the at least one selected instant message was sent to be included in the subject of the email message.

The computer processing system may be configured to cause the name of the sender of each instant message to be included in the subject of the email message.

The computer processing system may be configured to delete one or more of the selected instant messages from the internal computer storage system after causing them to be delivered to the external computer storage system. The user interface may be configured to allow the user to select the instant messages to be deleted. The user interface may be configured to receive a schedule from the user for the deletion of the instant messages. The computer processing system may be configured to delete the instant messages in accordance with the schedule.

The user interface may be configured to allow the user to select one or more of the backed-up instant messages that are stored in the external computer storage system for restoring on the wireless mobile communication device. The computer processing system may be configured to restore each of the instant messages that the user has selected for restoring to the internal computer storage system as an instant message.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

FIG. 3 illustrates an example of a dialog box configured to receive a selection of instant messages to back-up.

FIG. 4 illustrates an example of a dialog box configured to receive a schedule for backing up instant messages.

FIG. 5 illustrates an example of a dialog box configured to receive a selection of instant messages to delete.

DETAILED DESCRIPTION OF ILLUSTRATIVE EMBODIMENTS

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

Figure 1:
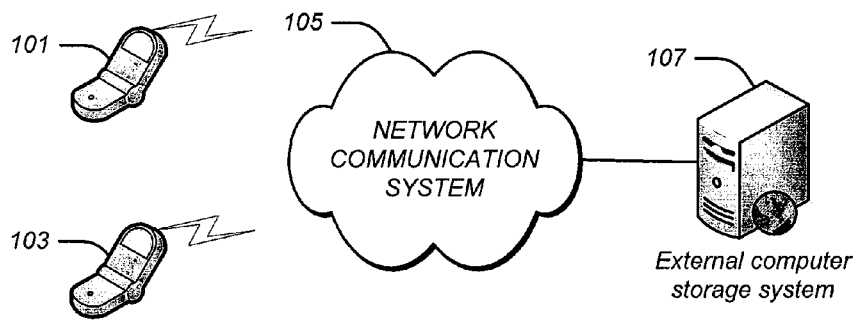
FIG. 1 illustrates an example of wireless mobile communication devices, a network communication system, and an email server.

FIG. 1 illustrates an example of wireless mobile communication devices, a network communication system, and an email server. One or more of the wireless mobile communication devices may be smart phones, such as smart phones 101 and 103. There number of wireless mobile communication devices may be different. One or more of the wireless mobile communication devices may be of a different type, such as a laptop or PDA.

The wireless mobile communication devices may be configured to communicate through a network communication system 105. The network communication system 105 may include a cellular telephone network, a cellular data network, the internet, a wide area network, a local area network, and/or any other type of network communication system. The network communication system 105 may include cell towers, satellites, and/or any other type of device which facilitates wireless communication with the wireless mobile communication devices, such as the smart phones 101 and 103.

An external computer storage system 107 may be provided which is external to the wireless mobile communication devices. The external computer storage system 107 may be configured to store backed-up instant messages which are received from the wireless mobile communication devices, as described in more detail below.

The external computer storage system 107 may be of any type. For example, the external computer storage system 107 may be configured to receive the backed-up instant messages over the network communication system 105, as illustrated in FIG. 1. The external computer storage system 107 may in addition or instead receive the backed-up instant messages more directly from the wireless mobile communication devices. For example, the external computer storage system 107 may be a flash memory, such as a micro SD card, which may be plugged into a wireless mobile communication device.

Figure 2:
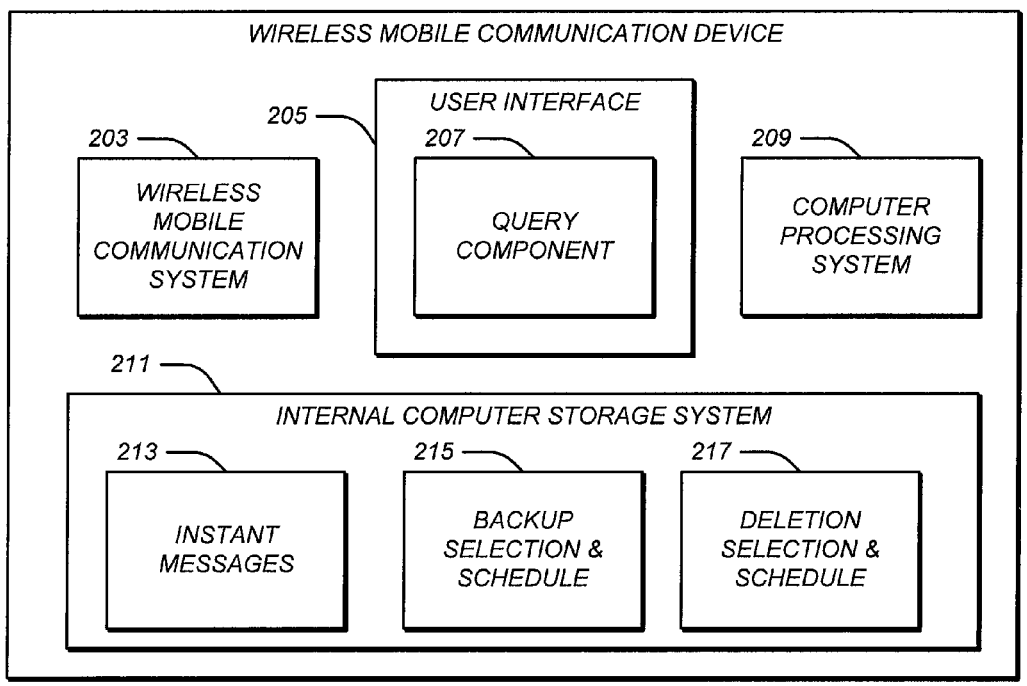
FIG. 2 illustrates an example of one of the wireless mobile communication devices illustrated in FIG. 1.

FIG. 2 illustrates an example of one of the wireless mobile communication devices illustrated in FIG. 1, such as the smart phone 101. The wireless mobile communication device which is illustrated in FIG. 2 may be used in connection with systems other than the one illustrated in FIG. 1. Similarly, the wireless mobile communication devices in FIG. 1 may have a configuration which is different from what is illustrated in FIG. 2.

As illustrated in FIG. 2, the wireless mobile communication device may include a wireless mobile communication system 203, a user interface 205 containing a query component 207, a computer processing system 209, and an internal computer storage system 211 containing instant messages 213, a backup selection & schedule 215, and a deletion selection & schedule 217.

The wireless mobile communication system 203 may be configured to communicate wirelessly over a network communication system, such as the network communication system 105. To facilitate this, the wireless mobile communication system 203 may include a radio transmitter, a radio receiver, an antenna, a computer processing system, a user interface which may include a display, touch screen, keyboard, microphone, loud speaker, earphone, and/or any other type of input or output device, and/or other types of components useful in facilitating this communication.

The user interface 205 may be configured to allow a user to select one or more of the instant messages 213 which are stored in the internal computer storage system 211 for backing up. The query component 207 may be configured to allow the user to specify a query which selects the instant messages for backing up.

The computer processing system 209 may be configured to cause the selected instant messages to be delivered to and stored within a computer storage system which is external to the wireless mobile communication device, such as the external computer storage system 107. The query component 207 may be configured to allow the user to specify a query which selects the instant messages for backing up based on the name of the sender of the instant messages, a date of the instant messages (e.g., the send or received date), the content of the instant messages, and/or based on any other criteria.

FIG. 3 illustrates an example of a dialog box configured to receive a selection of instant messages to back-up. This dialog box may be generated by the query component 207 within the user interface 205. As illustrated in FIG. 3, the dialog box may allow the user to specify the query criteria, such as the name of the person which sent the instant messages to be backed up and/or a time period during which the instant messages were received. The dialog box may instead allow the user to individually select messages from a list or to select all of the messages. The dialog box may be configured to allow the user to specify different query parameters, such as text which must be within the instant messages and/or any other type of selection criteria. The dialog box may be configured to allow the user to select or otherwise enter multiple selection criteria. The backup selection which the user enters may be stored in the internal computer storage system 211 as part of the backup selection & schedule 215, as illustrated in FIG. 2.

The user interface 205 may be configured to allow a user to specify a schedule for backing up. The computer processing system 209 may be configured to cause the selected instant messages to be delivered to the external computer storage system 107 in accordance with this schedule.

FIG. 4 illustrates an example of a dialog box configured to receive a schedule for backing up instant messages. This dialog box may be generated by the user interface 205. As illustrated in FIG. 4, a user may schedule the backing up to take place on a particular day of every week at a particular time, immediately after the instant message is read, or not to back-up at all. Different scheduling criteria may in addition or instead be provided, such as backing up at multiple times during the week or during a single day. The backup schedule which the user enters may be stored in the internal computer storage system 211 as part of the backup selection & schedule 215, as illustrated in FIG. 2.

The external computer storage system 107 may be or include a cloud server, which may be or include an email server. When using email server, the computer processing system 209 may be configured to cause each of the selected instant messages to be delivered to and stored within the email server as part of an email message. When the instant message is an instant SMS message, for example, the computer processing system may be configured to cause the instant SMS message to be delivered to and stored within the external email server as part of the text of the email message. When the instant message is an instant MMS message, on the other hand, the computer processing system 209 may be configured to cause the instant MMS message to be delivered to and stored within the external email server as an attachment to the email message.

The computer processing system 209 may be configured to cause the phone number from which the selected instant message was sent and/or the sender of the selected instant message to be the subject of the email message or to at least be included as part of that subject.

The computer processing system 209 may be configured to delete one or more of the selected instant messages from the internal computer storage system 211 after causing these selected instant messages to be delivered to the external computer storage system 107. The user interface 205 may be configured to allow the user to select the instant messages to be deleted. The query component 207 may be configured to facilitate this functionality. The deletion selection which the user enters may be stored in the internal computer storage system 211 as part of the deletion selection & schedule 217, as illustrated in FIG. 2.

FIG. 5 illustrates an example of a dialog box configured to receive a selection of instant messages to delete. This dialog box may be generated by the query component 207 within the user interface 205. The dialog box illustrated in FIG. 5 may be the same as the dialog box illustrated in FIG. 3, and subject to the same variations as are discussed above in connection with FIG. 3, except that the function of the dialog box illustrated in FIG. 5 may be to specify the criteria for selecting the backed-up instant messages that are to be deleted, rather than to specify the criteria for selecting the instant messages to be backed up in the first instance. The selection criteria which is specified through the dialog box illustrated in FIG. 5 may be stored in the internal computer storage system 211 as part of the deletion selection & schedule 217.

The user interface 205 may be configured to receive a schedule from the user for the deletion of the instant messages. The computer processing system 209 may be configured to delete the instant messages in accordance with this schedule.

Figure 6:
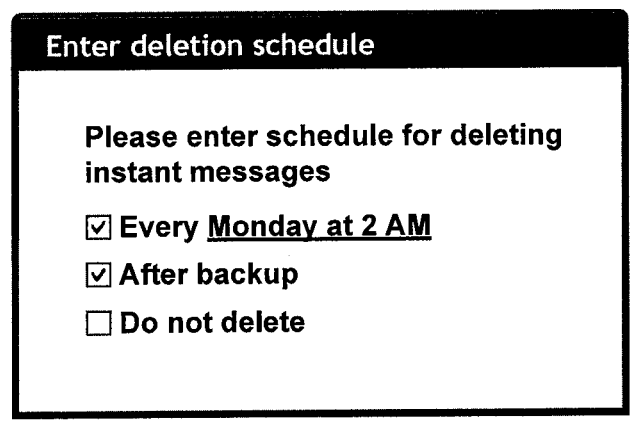
FIG. 6 illustrates an example of a dialog box configured to receive a schedule for deleting instant messages.

FIG. 6 illustrates an example of a dialog box configured to receive a schedule for deleting instant messages. This dialog box may be generated by the user interface 205. The dialog box illustrated in FIG. 6 may be the same as the dialog box illustrated in FIG. 4, and subject to the same variations as discussed above in connection with FIG. 4, except that the dialog box may be used to specify a schedule for deleting backed-up instant messages, as opposed to a schedule for backing them up in the first instance. The schedule which is specified through the use of the dialog box illustrated in FIG. 6 may be stored in the internal computer storage system 211 as part of the deletion selection & schedule 217.

The user interface 205 may be configured to allow the user to select one or more of the backed-up instant messages that are stored within the external computer storage system 107 for restoring on the wireless mobile communication device. The computer processing system 209 may be configured to restore each of the instant messages that the user has selected for restoring to the internal computer storage system 211 as an instant message and as part of the instant messages 213.

The query component 207 in the user interface 205 may be configured to allow the user to specify a query which selects the instant messages from the external computer storage system 107 for restoring.

Figure 7:
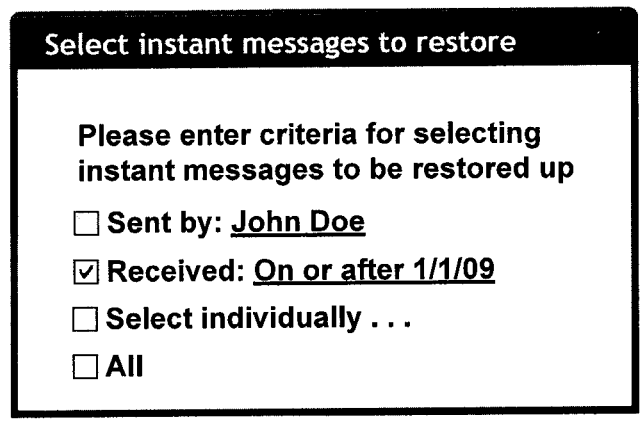
FIG. 7 illustrates an example of a dialog box configured to receive a selection of instant messages to restore.

FIG. 7 illustrates an example of a dialog box configured to receive a selection of instant messages to restore. This dialog box may be generated by the query component 207 within the user interface 205. The selection criteria illustrated in FIG. 7 may be the same as the selection criteria illustrated in FIG. 3, including all of its variations as discussed above in connection with FIG. 3, except that the function of the dialog box illustrated in FIG. 7 may be to select the instant messages that are to be restored from the external computer storage system 107, not backed up to the external computer storage system 107.

Different wireless mobile communication devices may be used in connection with the back-up and restore operations. For example, selected instant messages that are stored on the smart phone 101 may be backed up to the external computer storage system 107 and then restored, in whole or in part, to the smart phone 103, or vice versa. The instant messages that are backed up to the external computer storage system 107 may also be viewed and if desired, selectively restored to other or additional devices, such as to a desktop computing system.

A computer software application program may be installed in each wireless mobile communication device to facilitate the back-up and/or restore functions which have been described herein. When backing up and/or restoring instant message to or from the external computer storage system 107, for example, this computer software application may be executed by the user and, during execution, present a dialog box of one or more of the types illustrated in FIGS. 3-7, including their variations discussed above. The computer software application program may be configured to implement the functionality associated with these dialog boxes, as also discussed above.

The computer software application may be provided on an application server which is connected to the network communication system 105. The application server may be configured to download the program into the wireless mobile communication device, such as into the smart phone 101 and/or the smart phone 103. A charge may be made for this download, or the application program may be included as part of a subscription to an instant messaging service.

Except as otherwise indicated, the wireless mobile communication devices and the external computer storage systems which have been discussed herein may each be implemented with a computer system configured to perform the functions which have been described herein for these components. Each computer system may include one or more computers at the same or different locations. When at different locations, the computers may be configured to communicate with one another through a wired and/or wireless network communication system. Each computer may include one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, mice, displays, microphones, sound reproduction systems, and/or touch screens). Each computer may be a personal computer, mainframe, workstation, single user system, multi-user system, server, portable computer, hand-held device, cell phone, smart cell phone, tablet, or part of a larger system, such a vehicle, appliance, and/or telephone system. Each computer may include software (e.g., one or more operating systems, device drivers, application programs, and/or communication programs), which may be configured when executed to cause the computer to perform one or more of the functions which have been described herein for the computer system. The software may include programming instructions and associated data and libraries. The software may implement one or more algorithms which may cause the computer to perform each function. The software may be stored on one or more tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, a wireless mobile communication device can be used to browse instant messages that are backed up on external computer storage system without restoring them to the wireless mobile communication device.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents. Notwithstanding, none of the claims are intended to embrace subject matter which fails to satisfy the requirement of Sections 101, 102, or 103 of the Patent Act, nor should they be interpreted in such a way. Any unintended embracement of such subject matter is hereby disclaimed.

Except as stated immediately above, nothing which has been stated or illustrated is intended or should be interpreted to cause a dedication of any component, step, feature, object, benefit, advantage, or equivalent to the public, regardless of whether it is or is not recited in the claims.

The invention claimed is:

1. A wireless mobile communication device comprising:
    a wireless mobile communication system configured to communicate wirelessly over a network communication system;
    an internal storage system configured to:
        selectively store, delete, and restore instant messages, the instant messages including short message service (SMS) messages and multimedia messaging service (MMS) messages; and
        generate a user interface configured to:
            allow a user of the wireless mobile communication device to provide an input related to selection of one or more stored instant messages for backing up within an external computer storage device including an email server based on at least a name of a sender of the one or more instant messages, wherein the sender of the one or more instant messages is different than the wireless mobile communication device;
            allow the user to delete the selected one or more stored instant messages from the internal storage system; and
            allow the user to restore one or more stored instant messages that have been backed up within the external computer storage device prior to being deleted from the internal storage system; and
    a processing system configured to:
        receive the input related to selection of the one or more instant messages based on the user input;
        select the one or more instant messages to be backed up within the external computer storage device, based on the user input;
        generate, for each of the selected instant messages, an email message wherein the selected instant message is included as part of the email message, the email message being delivered to and stored within the email server;
        obtain each of the selected one or more instant messages, that were backed up within the external computer storage device and deleted from the internal storage system from the respective delivered email message; and
        selectively restore each obtained instant message as an instant message within the internal storage system of the wireless mobile communication device according to predefined criteria relating to the delivered instant messages that are selectively restored.

2. The wireless mobile communication device of claim 1 wherein the input related to selection of the one or more instant messages for backing up is based on a date of the instant messages.

3. The wireless mobile communication device of claim 1 wherein:
    at least one of the selected instant messages is sent from a phone having a phone number; and
    the processing system is configured to cause the phone number from which the at least one selected instant message was sent to be included in the subject of the email message.

4. The wireless mobile communication device of claim 1 wherein the processing system is configured to cause the name of the sender of each instant message to be included in the subject of the email message.

5. The wireless mobile communication device of claim 1 wherein the processing system is configured to delete one or more of the selected instant messages from the internal storage system of the wireless mobile communication device after causing them to be delivered to the external computer storage device, as the backed up copies of the selected instant messages.

6. The wireless mobile communication device of claim 5 wherein the user interface is configured to allow the user to select one or more of the backed up copies of the instant messages for deletion.

7. The wireless mobile communication device of claim 5 wherein:
    the user interface is configured to receive a schedule from the user for the deletion of one or more of the backed-up copies of the instant messages stored in the external computer storage device; and the processing system is configured to, in accordance with the schedule, delete the one or more of the backed up copies of the instant messages stored in the external computer storage device.

8. The wireless mobile communication device of claim 1 wherein:
the user interface is configured to receive an input from the user related to selection of one or more of the backed-up copies of the instant messages that are stored in the external computer storage device for restoring the selected one or more of the backed up copies of the instant message on the wireless mobile communication device; and
the processing system is configured to restore each of the backed-up copies of the instant messages that the user has selected for restoring to the internal storage system of the wireless mobile communication device as an instant message.

9. The wireless mobile communication device of claim 1, wherein the email message includes the selected instant message as text when the selected instant message is an SMS message.

10. The wireless mobile communication device of claim 9, wherein the email message includes the selected instant message as an attachment when the selected instant message is an MMS message.

11. The wireless mobile communication device of claim 1, wherein the email message includes the selected instant message as an attachment when the selected instant message is an MMS message.

12. The wireless mobile communication device of claim 1, wherein the processing system is configured to retrieve, for each of the one or more instant messages to be selectively restored, the respective email message stored in the email server, obtain the instant message included as part of the retrieved email message and restore the obtained instant message to the internal storage system.

13. A wireless mobile communication device comprising:
a wireless mobile communication system configured to communicate wirelessly over a network communication system;
an internal storage system configured to selectively store, delete, and restore instant messages, the instant messages including short message service (SMS) messages and multimedia messaging service (MMS) messages;
a user interface configured to receive an input from a user to enable selection of one or more instant messages, which have been stored in the wireless mobile communication device, from among a plurality of instant messages backed up within an external computer storage device including an email server based on at least a name of the sender of the one or more instant messages, wherein the sender of the one or more instant messages is different than the wireless mobile communication device, each of the backed up instant messages being delivered by the wireless mobile communication device and stored within the email server as part of an email message; and
a processing system configured to cause each of the selected one or more instant messages to be delivered from the email server as a respective delivered email message to the wireless mobile communication device, wherein the processing system is configured to obtain each of the selected one or more instant messages from the respective delivered email message and selectively restore each obtained instant message as an instant message within the internal storage system of the wireless mobile communication device according to predefined criteria relating to the delivered instant messages that are selectively restored.

14. The wireless mobile communication device of claim 13 wherein the user interface includes a query component configured to receive the input from the user related to selection of the one or more of the instant messages for restoring.

15. The wireless mobile communication device of claim 14 wherein the input from the user related to selection of the one or more of the instant messages for restoring is based on the name of the sender of the instant messages.

16. The wireless mobile communication device of claim 14 wherein the input from the user related to selection of the one or more of the instant messages for restoring is based on a date of the instant messages.

17. A wireless mobile communication device comprising:
an internal storage system configured to selectively store, delete, and restore instant messages in the internal storage system of the wireless mobile communication device, the instant messages including short message service (SMS) messages and multimedia messaging service (MMS) messages;
a user interface configured to receive from a user of the wireless mobile communication device a schedule for backing up one or more of the stored instant messages based on at least a name of the sender of the one or more of the instant messages, wherein the sender of the one or more instant messages is different than the wireless mobile communication device; and
a processing system configured to (1) cause the one or more of the stored instant messages to be delivered to and stored within an external computer storage system including an email server over a network communication system as backed up copies of the stored instant messages, by generating, for each of the one or more stored instant messages, an email message wherein the stored instant message is included as part of the email message, the email message being delivered to and stored within the email server and (2) obtain each of the one or more of the instant messages that were backed up within the external computer storage system, from the respective delivered email message and selectively restore each obtained instant message as an instant message within the internal storage system of the wireless mobile communication device according to predefined criteria relating to the delivered instant messages that are selectively restored.

18. The wireless mobile communication device of claim 17, wherein the user interface is configured to receive user selection of the one or more of the stored instant messages for backing up from among multiple options including all of: the name of the sender of the stored instant messages, a date of the stored instant messages, individual selection of the stored instant messages and all of the stored instant messages.

19. A method comprising:
receiving, at a wireless mobile communication device, a composite input from a user of the wireless mobile communication device, via a user interface, wherein the composite input includes selection of one or more instant messages stored in the wireless mobile communication device and a schedule for backing up, based on at least a name of the sender of the one or more of the instant messages, wherein the sender is different than the wireless mobile communication device, the one or more stored instant messages in the wireless mobile communication device being backed up to an external computer storage system including an email server over a network communication system, the instant messages including short message service (SMS) messages and multimedia messaging service (MMS) messages;

generating, by the wireless mobile communication device, for each of the one or more stored instant messages, an email message wherein the stored instant message is included as part of the email message;

delivering, as the corresponding email message, in accordance with the schedule, each of the one or more stored instant messages from the wireless mobile communication device to the email server, as backed up copies of the stored instant messages;

obtaining each of the one or more stored instant messages that were delivered to the external computer storage system including the email server, from the respective delivered email message; and selectively restoring each obtained instant message as an instant message within an internal storage system of the wireless mobile communication device according to predefined criteria relating to the delivered instant messages that are selectively restored.

20. The method of claim 19, further comprising:

receiving, at the wireless mobile communication device, an input from the user of the wireless mobile communication device, the input relating to selection of one or more backed up copies of instant messages in the external computer storage system that have been deleted at the wireless mobile communication device;

delivering, from the wireless mobile communication device to the external computer storage system, the selection of the one or more backed up copies of the stored instant messages stored in the external computer storage system;

retrieving, in response to reception of the selection, the one or more selected backed up copies of the stored instant messages from the external computer storage system based on the received input relating to the selection of the one or more backed up copies of the stored instant messages in the external computer storage system;

providing the retrieved one or more selected backed up copies of the stored instant messages from the external computer storage system to the wireless mobile communication device; and restoring the retrieved one or more selected backed up copies of the stored instant messages provided to the wireless mobile communication device as instant messages in the wireless mobile communication device.

21. The method of claim 19, further comprising:

receiving, at a second wireless mobile communication device that is different from the wireless mobile communication device from which the composite input was received, an input from a user of the second wireless mobile communication device, the input relating to selection of one or more backed up copies of the stored instant messages in the external computer storage system;

retrieving the one or more selected backed up copies of the stored instant messages from the external computer storage system based on the received input relating to the selection of the one or more backed up copies of instant messages in the external computer storage system;

providing the retrieved one or more selected backed up copies of the stored instant messages to the second wireless mobile communication device; and restoring the retrieved one or more selected backed up copies of the stored instant messages provided to the second wireless mobile communication device as instant messages in the second wireless mobile communication device.

* * * * *